US006439728B1

(12) United States Patent
Copeland (10) Patent No.: US 6,439,728 B1
(45) Date of Patent: Aug. 27, 2002

(54) MULTIMIRROR STACK FOR VERTICAL INTEGRATION OF MEMS DEVICES IN TWO-POSITION RETROREFLECTORS

(75) Inventor: Frederick Kent Copeland, Nederland, CO (US)

(73) Assignee: Network Photonics, Inc., Boulder, CO (US)

(*) Notice: Subject to any disclaimer, the term of this patent is extended or adjusted under 35 U.S.C. 154(b) by 0 days.

(21) Appl. No.: 09/941,998

(22) Filed: Aug. 28, 2001

(51) Int. Cl.[7] .................................................. G02B 5/12
(52) U.S. Cl. ...................... 359/515; 359/224; 359/225; 359/226; 359/298; 359/527
(58) Field of Search ................................. 359/515, 224, 359/225, 226, 298, 527, 827, 130, 131, 132, 173; 385/24, 37, 14, 17, 16, 18–23

(56) References Cited

U.S. PATENT DOCUMENTS

| | | | |
|---|---|---|---|
| 5,414,540 A | 5/1995 | Patel et al. | |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,307,657 B1 | 10/2001 | Ford | |

OTHER PUBLICATIONS

U.S. application No. 09/442,061, Weverka et al., filed Nov. 16, 1999.

Ford, Joseph E., et al., "Wavelength Add–Drop Switching Using Tilting Micromirros," Journal of Lightwave Technology, vol. 17, No. 5, May 1999.

Grade, John D., et al., "A Large–Deflection Electrostatic Actuator for Optical Switching Applications," Solid–State Sensor and Actuator Workshop, Hilton Head Island, SC, pp. 97–100, Jun. 4–8, 2000.

Nishi, I., et al., "Broad–Passband–Width Optical Filter for Multi/Demultiplexer Using a Diffraction Grating and a Retroreflector Prism," Electronics Letters, vol. 21, No. 10, May 9, 1985.

Philippe, P, et al., "Wavelength demultiplexer: using echelette gratings on silicon substrate," Applied Optics, vol. 24, No. 7, pp. 1006–1011, Apr. 1, 1985.

Rallison, R.D., "Dense Wavelength Division Multiplexing (DWDM) and the Dickson Grating," White Paper, Jan. 6, 2001.

Sun, Z. J., et al., "Demultiplexer with 120 Channels and 0.29–nm Channel Spacing," IEEE Photonics Technology Letters, vol. 10, No. 1, pp. 90–92, Jan. 1, 1998.

*Primary Examiner*—Mohammad Sikder
(74) *Attorney, Agent, or Firm*—Townsend and Townsend and Crew LLP (57) ABSTRACT

A retroreflector is provided with a substrate over which a moveable micromirror is formed. The moveable micromirror is adapted to be tilted into at least two distinct positions. A multimirror stack is also positioned on the substrate. The multimirror stack includes multiple fixed structures bonded together. Each of the fixed structures has a reflective surface, and the multimirror stack is configured with respect to the moveable micromirror to provide retroreflection paths. An optical ray incident at a predetermined angle with respect to the substrate is subjected to retroreflection for at least two distinct positions of the moveable micromirror. Each retroreflection includes a reflection off the moveable micromirror and a reflection off one of the fixed structures.

22 Claims, 5 Drawing Sheets

MULTIMIRROR STACK FOR VERTICAL INTEGRATION OF MEMS DEVICES IN TWO-POSITION RETROREFLECTORS

BACKGROUND OF THE INVENTION

This application relates generally to fiber-optic communications and more specifically to a method and apparatus for retroreflecting optical signals.

Fiber-optics-based telecommunication systems are increasingly viewed as a means for addressing the recent explosion in global demand for bandwidth. Such systems are beginning to deploy dense wavelength division multiplexing ("DWDM") to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is thus multiplied by the number of DWDM channels used.

In order to perform wavelength routing functions, a variety of optical elements, including focusing elements such as lenses or mirrors, dispersion elements such as diffraction gratings or prisms, and direction elements such as retroreflectors, may be used. For certain types of routing, an array of retroreflectors may be used, the performance of which is affected by a number of factors, including sensitivity to temperature. Because of the environments in which wavelength routers are deployed, they may experience temperature changes of up to about 55° C. As a result, components used in the retroreflectors may change in size and affect the operation and overall efficiency of the router. For example, such temperature changes may affect the focal length of the retroreflectors and/or cause signals to drift off targets. In addition, some designs for wavelength routers may include a relatively large number of retroreflectors so that designs that limit the amount of material used without adversely affecting performance are generally preferable.

BRIEF SUMMARY OF THE INVENTION

Hence, in different aspects, this invention is related to a method and apparatus that provides an athermalized retroreflector and/or limits the amount of material needed to fabricate the retroreflector. In this way, an improved wavelength router is provided that may successfully be deployed in a wide variety of environments.

In one embodiment, a substrate is provided over which a moveable micromirror is formed. The moveable micromirror is adapted to be tilted into at least two distinct positions. A multimirror stack is also positioned on the substrate. The multimirror stack includes a plurality of fixed structures bonded together. Each of the fixed structures has a reflective surface, and the multimirror stack is configured with respect to the moveable micromirror to provide retroreflection paths. An optical ray incident at a predetermined angle with respect to the substrate is subjected to retroreflection for at least two distinct positions of the moveable micromirror. Each retroreflection includes a reflection off the moveable micromirror and a reflection off one of the fixed structures. In certain embodiments, the fixed structures are substantially isomorphic in shape. They may also comprise the same material, which in one embodiment is PYREX®. The fixed structures may be bonded along surfaces that are substantially parallel to the substrate.

In another embodiment, an additional fixed structure having a reflective surface is positioned on the substrate and each retroreflection also includes a reflection off this additional fixed structure. Such an embodiment permits the optical ray to be incident substantially orthogonal to the substrate. Accordingly, in one embodiment, a window is provided for hermetically sealing the moveable micromirror, the multimirror stack, and the additional fixed structure.

Embodiments of the invention may include a plurality of such retroreflectors as part of a wavelength router. Such a wavelength router is configured to receive, at an input port, light having a plurality of spectral bands, subsets of which are directed to respective output ports. An optical train is disposed between the input port and the output ports providing optical paths for routing the spectral bands. The optical train includes an optical element disposed to collimate light emanating from the input port and a dispersive element disposed to intercept light traveling from the input port. The retroreflectors lie in a focal plane of the optical element and each is adapted to intercept a spectral band and direct the spectral band back towards the optical element.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Wavelength Routers

Retroreflectors fabricated in accordance with embodiments of the invention may be used in a variety of applications, including in wavelength routers. Exemplary embodiments of wavelength routers are provided in copending, commonly assigned U.S. patent application Ser. No. 09/442,061 ("the '061 application"), which is herein incorporated by reference in its entirety, including the Appendix, for all purposes. The retroreflectors may be used in any appropriate wavelength router configuration, including both single- and dual-pass-type wavelength routers.

In all telecommunication networks, there is the need to connect individual channels (or circuits) to individual destination points, such as to an end customer or to another network. Systems that perform these functions are called cross-connects. Additionally, there is the need to add or drop particular channels at an intermediate point. Systems that perform these functions are called add-drop multiplexers ("ADM"s). All of these networking functions may be performed with an all-optical wavelength router. Optical networks designed to operate at the wavelength level are commonly called "wavelength routing networks" or "optical transport networks" ("OTN"). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers ("OADM") and wavelength-selective cross-connects ("WSXC").

Wavelength routing functions may be performed optically with a freespace optical train disposed between the input ports and the output ports, and a routing mechanism. The free-space optical train can include air-spaced elements or can be of generally monolithic construction. The optical train includes a dispersive element such as a diffraction grating, and is configured so that the light from the input port encounters the dispersive element twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the dispersive element.

Figure 1A:
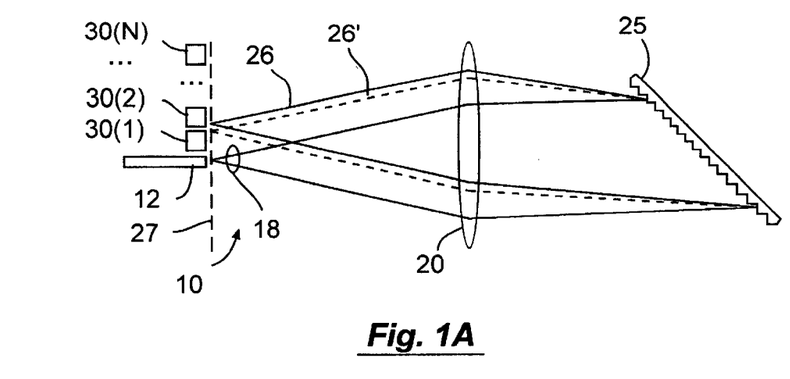
FIGS. 1A, 1B, and 1C are schematic top, side, and end views, respectively, of one embodiment of a wavelength router that uses spherical focusing elements.
Figure 1B:
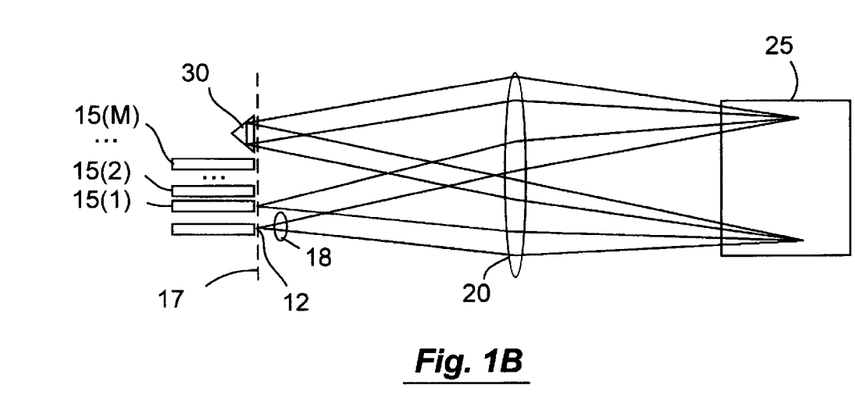
Figure 1C:
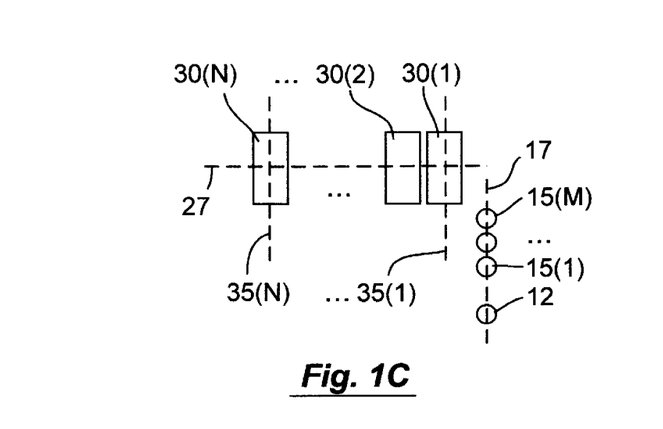

FIGS. 1A, 1B, and 1C are schematic top, side, and end views, respectively, of one embodiment of a wavelength router 10. Its general functionality is to accept light having a plurality N of spectral bands at an input port 12, and to direct subsets of the spectral bands to desired ones of a plurality M of output ports, designated 15(1) ... 15(M). The output ports are shown in the end view of FIG. 1C as disposed along a line 17 that extends generally perpendicular to the top view of FIG. 1A. Light entering the wavelength router 10 from input port 12 forms a diverging beam 18, which includes the different spectral bands. Beam 18 encounters a lens 20 that collimates the light and directs it to a reflective diffraction grating 25. The grating 25 disperses the light so that collimated beams at different wavelengths are directed at different angles back towards the lens 20.

Two such beams are shown explicitly and denoted 26 and 26', the latter drawn in dashed lines. Since these collimated beams encounter the lens 20 at different angles, they are focused towards different points along a line 27 in a transverse plane extending in the plane of the top view of FIG. 1A. The focused beams encounter respective ones of a plurality of retroreflectors that may be configured as described below, designated 30(1) ... 30(N), located near the transverse plane. The beams are directed back, as diverging beams, to the lens 20 where they are collimated, and directed again to the grating 25. On the second encounter with the grating 25, the angular separation between the different beams is removed and they are directed back to the lens 20, which focuses them. The retroreflectors 30 may be configured to send their intercepted beams along a reverse path displaced along respective lines 35(1) ... 35(N) that extend generally parallel to line 17 in the plane of the side view of FIG. 1B and the end view of FIG. 1C, thereby directing each beam to one or another of output ports 15.

Figure 2A:
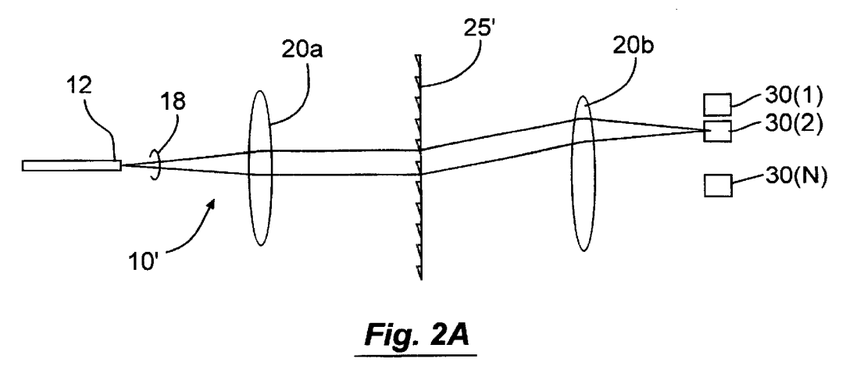
FIGS. 2A and 2B are schematic top and side views, respectively, of a second embodiment of a wavelength router that uses spherical focusing elements.
Figure 2B:
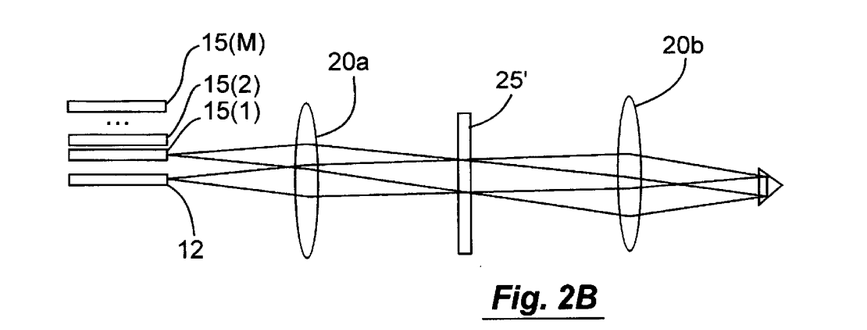

Another embodiment of a wavelength router, designated 10', is illustrated with schematic top and side views in FIGS. 2A and 2B, respectively. This embodiment may be considered an unfolded version of the embodiment of FIGS. 1A–1C. Light entering the wavelength router 10' from input port 12 forms diverging beam 18, which includes the different spectral bands. Beam 18 encounters a first lens 20a, which collimates the light and directs it to a transmissive grating 25'. The grating 25' disperses the light so that collimated beams at different wavelengths encounter a second lens 20b, which focuses the beams. The focused beams are reflected by respective ones of plurality of retroreflectors 30, which may also be configured as described below, as diverging beams, back to lens 20b, which collimates them and directs them to grating 25'. On the second encounter, the grating 25' removes the angular separation between the different beams, which are then focused in the plane of output ports 15 by lens 20a.

Figure 3:
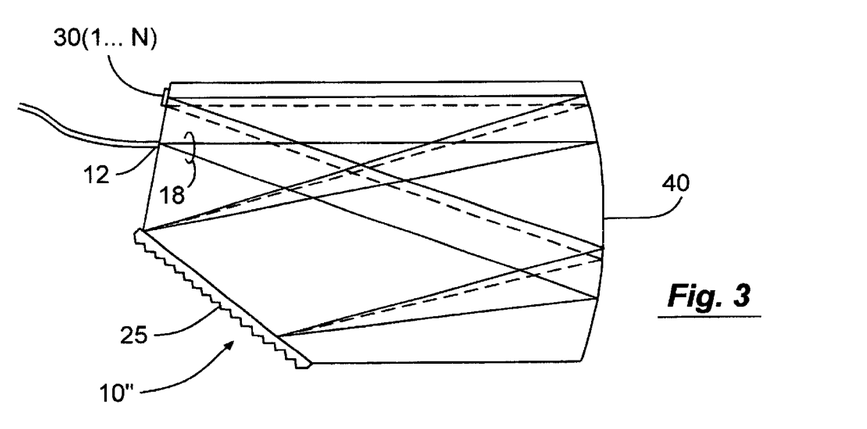
FIG. 3 is a schematic top view of a third embodiment of a wavelength router that uses spherical focusing elements.

A third embodiment of a wavelength router, designated 10", is illustrated with the schematic top view shown in FIG. 3. This embodiment is a further folded version of the embodiment of FIGS. 1A–1C, shown as a solid glass embodiment that uses a concave reflector 40 in place of lens 20 of FIGS. 1A–1C or lenses 20a and 20b of FIGS. 2A–2B. Light entering the wavelength router 10 " from input port 12 forms diverging beam 18, which includes the different spectral bands. Beam 18 encounters concave reflector 40, which collimates the light and directs it to reflective diffraction grating 25, where it is dispersed so that collimated beams at different wavelengths are directed at different angles back towards concave reflector 40. Two such beams are shown explicitly, one in solid lines and one in dashed lines. The beams then encounter retroreflectors 30 and proceed on a return path, encountering concave reflector 40, reflective grating 25', and concave reflector 40, the final encounter with which focuses the beams to the desired output ports. Again, the retroreflectors 30 may be configured as described below.

2. Retroreflectors

Described below are several retroreflector embodiments. Such embodiments may be used for a wide variety of purposes, some of which include being used specifically as retroreflectors 30 in a wavelength router. The retroreflector embodiments described are sufficiently versatile to be used as part of any of the wavelength routers described in the '061 application or as part of other wavelength routers.

Figure 4A:
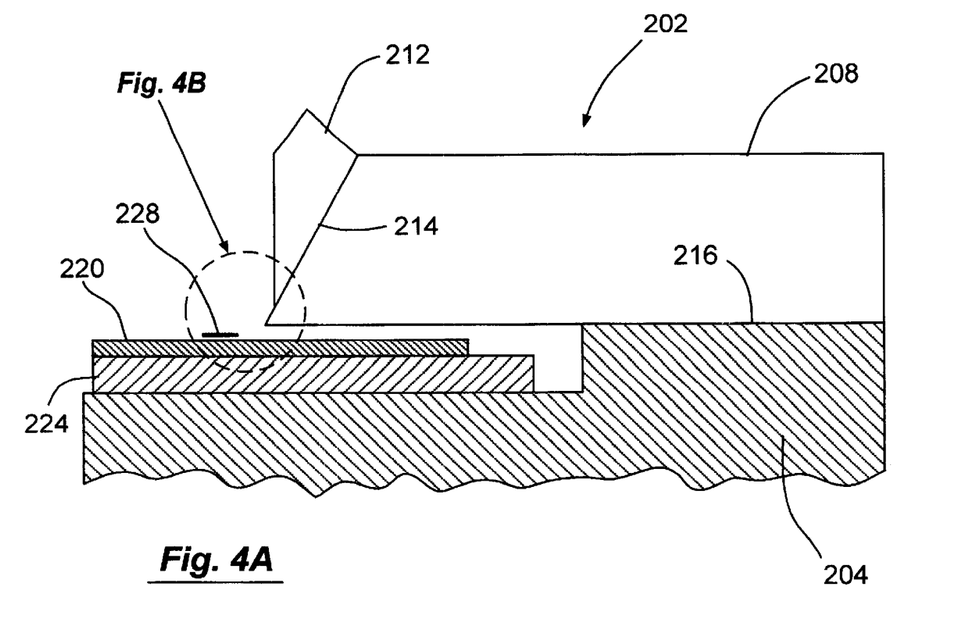
FIGS. 4A and 4B are cross-sectional views of an embodiment that implements a retroreflector.
Figure 4B:
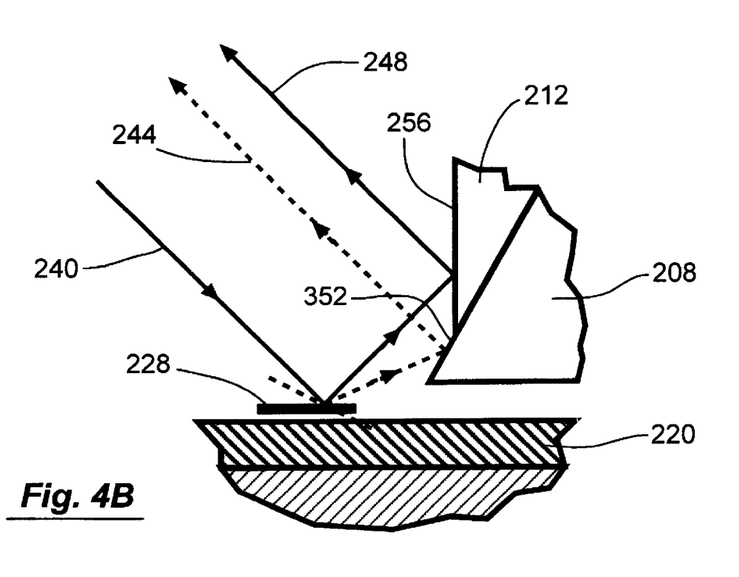

In the embodiment shown in FIGS. 4A and 4B, the retroreflector 202 comprises a moveable micromirror 228 and two fixed row mirrors. The retroreflector 202 assembly is shown generally in FIG. 4A, with a detail of the micromirror operation shown in FIG. 4B. Both the moveable micromirror 228 and the fixed row mirrors are affixed with a mount 204, which is used to position the retroreflector 202 assembly appropriately within the wavelength router. A number of aspects of the design illustrate features that act to athermalize the retroreflector 202.

To facilitate integration of the retroreflector 202 assembly, the mount 204 is typically fabricated of a material such as stainless steel, which has a coefficient of thermal expansion ("CTE") of about $17 \times 10^{-6}$ m/m per ° C. The CTE is defined generally, for a given material, as the ratio of (1) the change in length of a line segment in a body per unit of temperature change to (2) its length at a reference temperature. The moveable micromirror 228 is fabricated as a microelectromechanical structure ("MEMS") device that can be carefully controlled. The MEMS micromirror 228 is fabricated on a MEMS die 220 formed of silicon. Sometimes, a MEMS die is referred to herein as a "substrate" The fixed row mirrors are formed of some type of glass and polished or coated, such as with a metallization surface, to achieve adequate reflectivity.

In the embodiment shown, the structure is athermalized in two principal ways. First, the MEMS die 220 is not bonded directly to the mount 204, but is instead bonded to a layer 224 of a controlled expansion alloy. The CTE of the layer 224 aids in matching the CTE's of the silicon MEMS die 220 ($2.7 \times 10^{-6}$ m/m per ° C.) and the mount 204 ($17 \times 10^{-6}$ m/m per ° C. for stainless steel). A suitable material in one embodiment is Alloy 39, which is a nickel-iron alloy that has a CTE of $2.3 \times 10^{-6}$ m/m per ° C. The first fixed row mirror comprises a glass structure 208 that is bonded directly to the mount 204 at bond 216 so as to be cantilevered over the MEMS die 220. It comprises a reflective surface 252, achieved by polishing and/or coating. The second fixed row mirror comprises a glass structure 212 bonded directly to the first glass structure 208 at bond 214. Surface 256 is polished and/or coated to be reflective.

The shape and positions of the glass structures 208 and 212 define the retroreflection paths as shown in FIG. 4B. Surfaces 252 and 256 are inclined with respect to each other at an angle that corresponds to the angular tilt of the moveable micromirror 228. Thus, in a first position of the moveable micromirror 228 (shown as a solid line), an incoming ray 240 is reflected off surface 256 of the second glass structure 212 to produce retroreflected ray 248. When the moveable micromirror 228 is instead in a second position (shown as a dashed line), the incoming ray 240 is reflected off surface 252 to produce retroreflected ray 244. Rays 244 and 248 are both substantially parallel to ray 240, but have an opposite direction of propagation to ray 240.

Athermalization of a retroreflector may be simplified by bonding structures used to form the fixed row mirrors directly with the MEMS die. One such embodiment is shown schematically in cross-section view in FIG. 5. In this embodiment, the structure of the retroreflector 302 is derived from the MEMS die 320. A moveable micromirror 332 is fabricated above the MEMS die 320 by any suitable technique, such as by providing a cantilever or torsion-beam micromirror. A variety of examples of micromirror structures are provided in the following copending, commonly assigned U.S. Patent Applications, each of which is herein incorporated by reference in its entirety: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTING ELEMENT BASED ON STEPWISE CONTROLLED TILTING MIRRORS," filed Jul. 3,2001 by Victor Buzzetta et al.; U.S. patent application Ser. No. 09/899,001, entitled "TWO-DIMENSIONAL FREE-SPACE OPTICAL WAVELENGTH ROUTING ELEMENT BASED ON STEPWISE CONTROLLED TILTING MIRRORS," filed Jul. 3, 2001 by Victor Buzzetta; U.S. patent application Ser. No. 09/899, 002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; and U.S. patent application Ser. No. 09/899,014, entitled "METHODS AND APPARATUS FOR PROVIDING A MULTI-STOP MICROMIRROR," filed Jul. 3, 2001 by David Paul Anderson. The moveable micromirror 332 is configured to have at least two positions that may be adapted as described below for retroreflecting an incoming optical ray 336.

Figure 5:
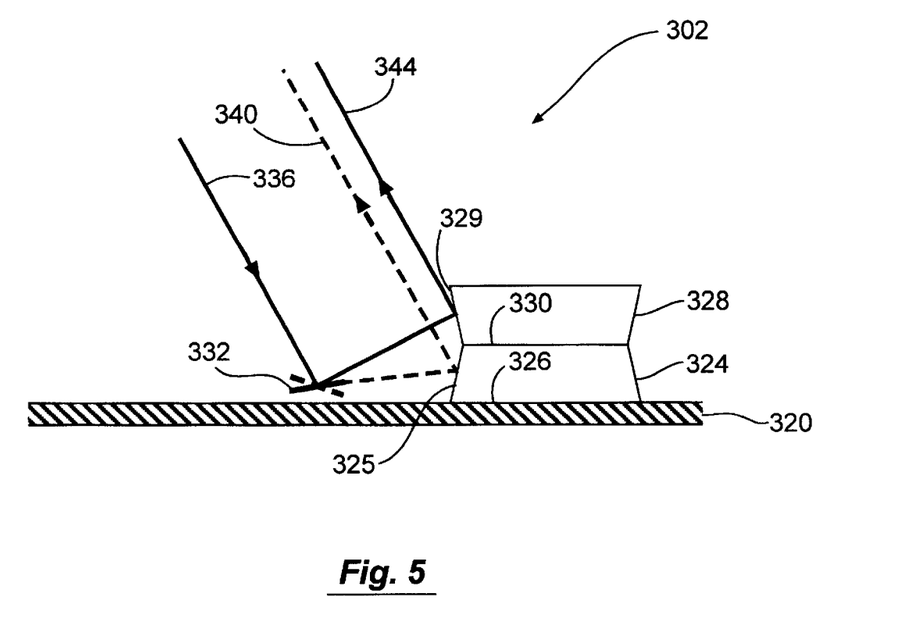
FIG. 5 is a cross-sectional view of an embodiment having a multimirror stack for vertical integration.

Bonded with the MEMS die 320 is a first fixed structure 324. In one embodiment, the first fixed structure 324 is bonded directly to the MEMS die 320 with bond 326, and may be bonded with any appropriate technique, including, for example, flip-chip bonding and gold bump bonding. The first fixed structure 324 should be made from a material that is relatively stable over a thermal excursion and which can be polished and/or coated, such as with a metallization surface, to produce a reflective surface 325. Suitable materials for the first fixed structure 324 where the MEMS die 320 comprises silicon include silicon, silicon carbide, silicon oxide, and PYREX®, which is a borosilicate composition that is alternatively identified as CORNING® glass No. 7740 and has a CTE of $3.25 \times 10^{-6}$ m/m per ° C. Various alternative materials may also be used. The first fixed structure 324 is also shaped and positioned with respect to the MEMS die 320 so that surface 325 is approximately orthogonal to the moveable micromirror 332 when in a first position (shown by dashed lines). Such an orientation thereby ensures that optical ray 336 will be retroreflected along a path 340 parallel to its incoming path but in the opposite direction.

Bonded to the first fixed structure 324 is a second fixed structure 328, which is also fabricated from a material that is relatively stable over a thermal excursion and which can be polished and/or coated, such as with a metallization surface, to produce a reflective surface 329. In one embodiment, the first and second fixed structures 324 and 328 are fabricated from the same material. The second fixed structure 328 is shaped and positioned with respect to the MEMS die 320 so that surface 329 is approximately orthogonal to the moveable micromirror 332 when in a second position (shown by a solid line). Such an orientation thereby ensures that optical ray 336 will be retroreflected along a path 344 parallel to its incoming path but in the opposite direction. In one embodiment, this criterion is achieved by producing the first and second fixed structures 324 and 328 to be approximately isomorphic in shape, whereby they may be bonded with bond 330 along a surface parallel to the MEMS die 320. In the embodiment shown, the orientations of the first and second fixed structures 324 and 328 are opposite, although their shapes are isomorphic. Production of isomorphic structures simplifies production and lowers the cost of the retroreflectors 302 since the fixed structures may be batch produced.

For the embodiment shown in FIG. 5, the retroreflector 302 may be mounted for integration within a wavelength router by any suitable method. For example, a structure similar to that shown in FIG. 4A may be used. The MEMS die may be affixed with a controlled expansion alloy, such as Alloy 39, which is itself affixed with a mount, fabricated of a material such as stainless steel that is good for integration with other components of the wavelength router. By using a controlled expansion alloy as an intermediary material between the MEMS die and the mount structure, sensitivity to changes in temperature is further reduced.

A retroreflector 302 constructed according to the embodiment illustrated in FIG. 5 functions with optical rays 336, 340, and 344 that are inclined with respect to the MEMS die 320. In some embodiments, it is desirable to seal the retroreflector to protect the retroreflector structures from contamination and/or damage. While it is possible to seal an array of retroreflectors, there may be advantages to sealing each of the retroreflectors individually so that the area to be kept free from contamination is localized. A sealing structure should be transparent at the wavelength of the optical rays and is preferably fabricated with a crystalline structure that will not cause an optical aberration to the optical rays.

Figure 6A:
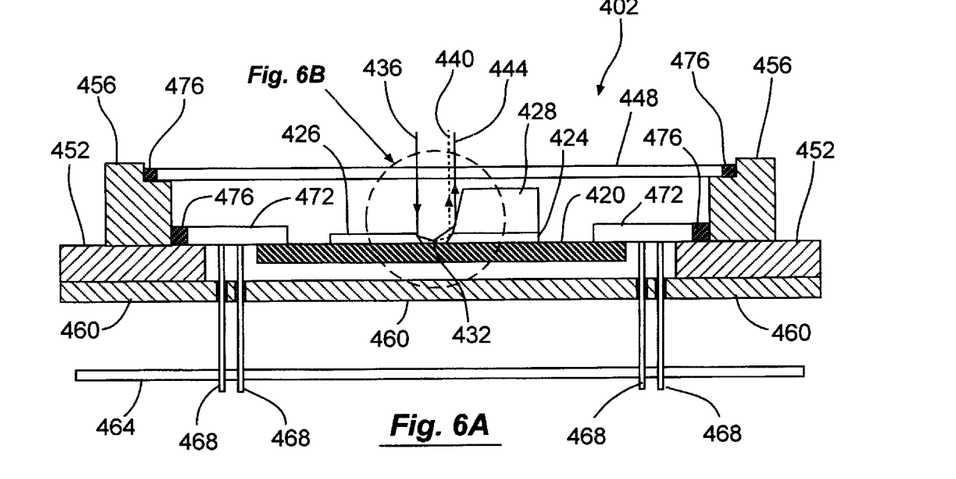
FIGS. 6A and 6B are cross-sectional views of an embodiment having a hermetically sealed multimirror stack.
Figure 6B:
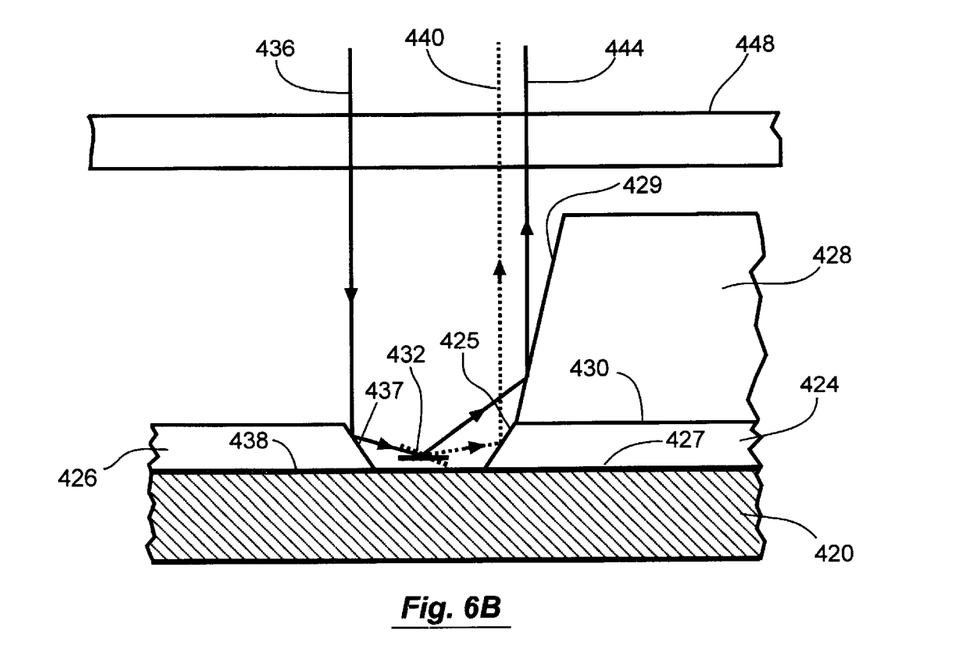

Thus, FIGS. 6A and 6B illustrate an embodiment for a hermetically sealed retroreflector 402 in which the sealing window 448 is substantially parallel to the underlying MEMS die 420. FIG. 6A provides a cross-sectional view of a complete hermetically sealed retroreflector 402 and FIG. 6B shows a detail of the reflection characteristics and optical paths. As in FIG. 5, good athermalization is achieved by bonding structures used to form the fixed row mirrors directly with the MEMS die 420. Thus, bonded with the MEMS die 420 are both a first fixed structure 424 and a second fixed structure 426. In one embodiment, one or both of the first and second fixed structures 424 and 426 is bonded directly to the MEMS die 420 with bond 427 and/or bond 438. As for the embodiment shown in FIG. 5, the first and second fixed structures 424 and 426 may be bonded with any appropriate technique, such as flip-chip bonding or gold bump bonding. In addition, they should also be made from a material that is relatively stable over a thermal excursion and which can be polished and/or coated, such as with a metallization surface, to produce reflective surfaces 425 and 437. Suitable materials include those mentioned for the embodiment shown in FIG. 5, namely silicon, silicon carbide, silicon oxide, and PYREX®. In one embodiment, the first and second fixed structures 424 and 426 are substantially isomorphic in shape, permitting fabrication efficiencies.

The precise angle at which the reflective surfaces 425 and 437 are inclined with respect to the MEMS die 420 depends on the specific geometry of the retroreflector 402. In order to act as a retroreflector, however, the fixed structures 424 and 426 are shaped and positioned so that an incoming optical ray 436 will be directed as follows when the moveable micromirror is in a first position (shown by the dashed line): off reflective surface 437 to moveable micromirror 432 to reflective surface 425. The total angular change in the optical path as a result of such reflections is substantially equal to 180°. For isomorphic fixed structures 424 and 426, retroreflection may be accomplished when the moveable micromirror 432 is in the first position (shown by a dashed line).

When the moveable micromirror 432 is in a second position (shown by the solid line), the incoming optical ray 436 is reflected instead to a reflective surface 429 comprised by a third fixed structure 428. The third fixed structure 428 is also formed of a material that is relatively stable over a thermal excursion and is amenable to polishing and/or coating to produce the reflective surface 429. In one embodiment, all three fixed structures 424, 426, and 428 are formed of the same material. The third fixed structure 428 is bonded with the first fixed structure 424, and in one embodiment is bonded along a bond 430 that is substantially parallel with the MEMS die 420. As shown in FIGS. 6A and 6B, the height of the third fixed structure 428 is greater than the height of the first and second fixed structures 424 and 426. This is to account for the fact that the optical rays reflected from the moveable micromirror 432 have a dispersion that increases with distance from a beam focus. Since the reflection of the ray off reflective surface 429 is farther from the moveable micromirror 432 than the reflection of the ray off reflective surface 425, the greater height permits the entire signal to be reflected.

With the configuration shown in FIGS. 6A and 6B, the optical rays 436, 440, and 444 are substantially orthogonal to the MEMS die 420 so that a window 448 may be positioned to seal the retroreflector without causes aberrations in the optical signals. One configuration for hermetically sealing the retroreflector 402 is shown in FIG. 6A. A common datum 452 is used to define a planar surface that forms the foundation for the sealed structure. For example, in this configuration the upper surface of the MEMS die 420 is positioned to be substantially coplanar with the common datum 452. This is achieved by mounting a ceramic carrier 472 to the common datum 452 and then mounting the MEMS die 420 to the ceramic carrier 472, such as by a standard flip-chip method. Mounting to a common datum 452 increases the reliability of the alignment of items forming the retroreflector 402 and less tolerance correction is required since mounting to the rest of the system is thereby performed on parallel surfaces.

The underside of the common datum 452 is mounted to a back cover 460 through which pins 468 may be connected from the ceramic carrier 472 to a flex cable, connector or printed circuit board where they are soldered in position. The pins 468 are used to provide electrical connections with the micromirror 432 in order to operate the moveable micromirror 432 so it can be moved to the different required positions. Traces from electrodes formed on the MEMS die 420 as part of the micromirror 432 are routed to the pins 468 in the ceramic carrier 472 and are connected using standard semiconductor contact, such as flip-chip connection. The pins 468 in the ceramic carrier 472 are on a sufficiently large spacing to accept a connector or printed circuit board.

Also mounted to the common datum 452 is a mount 456 that acts to provide side walls for sealing the chamber housing the micromirror components. thermalized perimeter bonds 476 are provided using an athermal edge/perimeter method between the mount 456, ceramic carrier 472, and common datum 452 to integrate the structure. A sealed window 448 is provided to cover the micromirror structures, also using athermalized perimeter bonds 476 for integration. The sealed window 448 may be composed of a material that is transparent to telecommunications wavelengths and which has a crystalline structure that will not cause aberrations in the optical signals. Suitable materials for the sealed window 448 comprise sapphire and fused silica, which may be coated with an antireflective coating. The CTE of fused silica with an antireflective coating is $5.5 \times 10^{-6}$ m/m per ° C.

Having described several embodiments, it will be recognized by those of skill in the art that various modifications, alternative constructions, and equivalents may be used without departing from the spirit of the invention. For example, while the exemplary embodiments have shown a two-position moveable micromirror and a multimirror stack having two fixed structures, it is possible more generally to use an N-position moveable micromirror with a multimirror stack having N fixed structures; in such an embodiment, an incident optical ray may be retroreflected along N distinct paths. Accordingly, the above description should not be taken as limiting the scope of the invention, which is defined in the following claims.

What is claimed is:

1. A retroreflector comprising:

a substrate;

a moveable micromirror formed over the substrate and adapted to be tilted into at least two distinct positions; and a multimirror stack positioned on the substrate, the multimirror stack including a plurality of fixed structures bonded together, each such fixed structure having a reflective surface, wherein the multimirror stack is configured such that an optical ray incident at a predetermined angle with respect to the substrate is subject to retroreflection for the at least two distinct positions of the moveable micromirror, such retroreflection including a reflection off the moveable micromirror and a reflection off one of the plurality of fixed structures.

2. The retroreflector recited in claim 1 wherein the optical ray is incident on the moveable micromirror.

3. The retroreflector recited in claim 1 wherein the fixed structures are substantially isomorphic in shape.

4. The retroreflector recited in claim 1 wherein each of the fixed structures comprises the same material.

5. The retroreflector recited in claim 1 wherein the material is PYREX®.

6. The retroreflector recited in claim 1 wherein the plurality of fixed structures are bonded along surfaces substantially parallel to the substrate.

7. The retroreflector recited in claim 1 further comprising an additional fixed structure positioned on the substrate and having a reflective surface, wherein each retroreflection further comprises a reflection off the additional fixed structure.

8. The retroreflector recited in claim 7 wherein the optical ray is incident on the additional fixed structure.

9. The retroreflector recited in claim 7 wherein the additional fixed surface is substantially isomorphic in shape to at least one of the plurality of fixed structures.

10. The retroreflector recited in claim 9 wherein the at least one of the plurality of fixed structures comprises a fixed structure in contact with the substrate.

11. The retroreflector recited in claim 7 further comprising a window for hermetically sealing the moveable micromirror, the multimirror stack, and the additional fixed structure.

12. The retroreflector recited in claim 7 wherein the optical ray is incident substantially orthogonal to the substrate.

13. A method for directing an optical ray, the method comprising:

provindg a retroreflector comprising a substrate, a moveable micromirror formed over the substrate and adapted to be tilted into at least two distinct positions, and a multimirror stack positioned on the substrate, the multimirror stack including a plurality of fixed structures bonded together, each such fixed structure having a reflective surface;

propagating the optical ray incident at a predetermined angle with respect to the substrate to provide a first retroreflection of the optical ray, such first retroreflection including a reflection off the moveable micromirror and a reflection off a first of the plurality of fixed structures; and changing a tilt of the moveable micromirror to retroreflect the optical ray with a second retroreflection that includes a reflection off the moveable micromirror and a reflection off a second of the plurality of fixed structures.

14. The method recited in claim 13 wherein the optical ray is incident on the moveable micromirror.

15. The method recited in claim 13 wherein the retroreflector further comprises an additional fixed structure positioned on the substrate and having a reflective surface, wherein the first and second retroreflections further include a reflection off the additional fixed structure.

16. The method recited in claim 15 wherein the optical ray is incident on the additional fixed structure.

17. The method recited in claim 13 wherein propagating the optical ray comprises propagating the optical ray through a window the hermetically seals the moveable micromirror, the multimirror stack, and the additional fixed structure.

18. A retroreflector comprising:

support means;

moveable reflection means formed over the support means and adapted to move into at least two distinct positions; and fixed reflection means positioned on the support means, the fixed reflection means configured such that an optical ray incident at a predetermined angle with respect to the support means is retroreflected for the at least two distinct positions of the moveable reflection means along distinct paths, each such path including a reflection off the moveable reflection means and off a portion of the fixed reflection means.

19. The retroreflector recited in claim 18 wherein the optical ray is incident on the moveable reflection means.

20. The retroreflector recited in claim 18 further comprising additional fixed reflection means positioned on the support means, wherein each such path further includes a reflection off the additional fixed reflection means.

21. The retroreflector recited in claim 20 further comprising means for sealing the moveable reflection means, the fixed reflection means, and the additional fixed reflection means.

22. The retroreflector recited in claim 21 wherein the sealing means is transparent to the optical ray.

* * * * *